(12) United States Patent
Ryan et al.

(10) Patent No.: US 6,885,645 B2
(45) Date of Patent: Apr. 26, 2005

(54) METHOD AND MOBILE STATION FOR CONTROLLING BEARER ASSIGNMENT

(75) Inventors: Bill Ryan, Algonquin, IL (US);
Lawrence Willis, McHenry, IL (US)

(73) Assignee: Motorola, Inc., Schaumburg, IL (US)

( * ) Notice: Subject to any disclaimer, the term of this patent is extended or adjusted under 35 U.S.C. 154(b) by 329 days.

(21) Appl. No.: 10/299,743

(22) Filed: Nov. 19, 2002

(65) Prior Publication Data

US 2004/0095903 A1 May 20, 2004

(51) Int. Cl.$^7$ .................................................. A04Q 7/00
(52) U.S. Cl. ...................... 370/329; 370/332; 370/341; 370/352; 455/515; 455/466; 455/414.1; 455/415
(58) Field of Search ................................. 370/332, 329, 370/341, 352; 455/515, 445, 466, 426.1, 414.1, 415

(56) References Cited

U.S. PATENT DOCUMENTS

| | | | |
|---|---|---|---|
| 6,701,155 B1 * | 3/2004 | Sarkkinen et al. ............ | 455/515 |
| 6,708,034 B1 * | 3/2004 | Sen et al. ..................... | 455/445 |
| 2003/0165123 A1 * | 9/2003 | Saunders et al. ............ | 370/329 |
| 2004/0176135 A1 * | 9/2004 | Palkisto ....................... | 455/560 |

* cited by examiner

*Primary Examiner*—Wellington Chin
*Assistant Examiner*—Mark Mais
(74) *Attorney, Agent, or Firm*—Marshall, Gerstein & Borun LLP

(57) ABSTRACT

A method (500) and a mobile station (160) for controlling bearer assignment are described herein. In a wireless communication system (100), a core network (210) is configured to provide communication services to the mobile station (160). The mobile station (160) may detect a resource conflict associated with a communication service within the mobile station (160). Upon detecting the resource conflict, the mobile station (160) may determine a condition of the resource conflict suggesting to delay a bearer assignment for the communication service. Based on the condition of the resource conflict, the mobile station (160) may transmit a request associated with the bearer assignment to the core network (210).

28 Claims, 5 Drawing Sheets

METHOD AND MOBILE STATION FOR CONTROLLING BEARER ASSIGNMENT

TECHNICAL FIELD

The present disclosure relates to wireless communication systems, and more particularly, to a method and a mobile station for controlling bearer assignment.

BACKGROUND

Current wireless technology permits service providers to provide a variety of communication services to subscribers. With Third Generation (3G) technology, for example, service providers may be able to provide on-line, real-time transfer of information. That is, a subscriber may be able to participate in a voice call while browsing the Internet at the same time. In another example, the subscriber may be able to download images and/or files during a live video conference call. To provide such communication services concurrently, many different core networks such as a circuit switched (CS) core network and a packet switched (PS) core network may be involved. For example, the CS and the PS core networks may work together to coordinate paging service (i.e., request for identification of a user equipment such as a cellular telephone, a pager, a personal digital assistant (PDA), and a handheld computer). Typically in the Universal Mobile Telecommunications System (UMTS), however, the interaction between the CS and the PS core networks is limited to paging only.

Further, some communication services from the CS and the PS core networks may require the same resources within the user equipment. That is, the user equipment may have certain external (e.g., bandwidth and data rate) and internal (e.g., memory) limitations. As a result, those services may exceed the capabilities of the user equipment by occurring concurrently and/or simultaneously.

One aspect of designing a wireless communication system is to optimize resources available to the user equipment. Because of the lack of coordination between the CS and the PS core networks, and limitations of the user equipment, resource conflicts between communication services may occur. Therefore, a need exists to allow the user equipment to coordinate the allocation of resources for communication services.

BRIEF DESCRIPTION OF THE DRAWINGS

This disclosure will describe several embodiments to illustrate its broad teachings. Reference is also made to the attached drawings.

DETAILED DESCRIPTION

Figure 1:
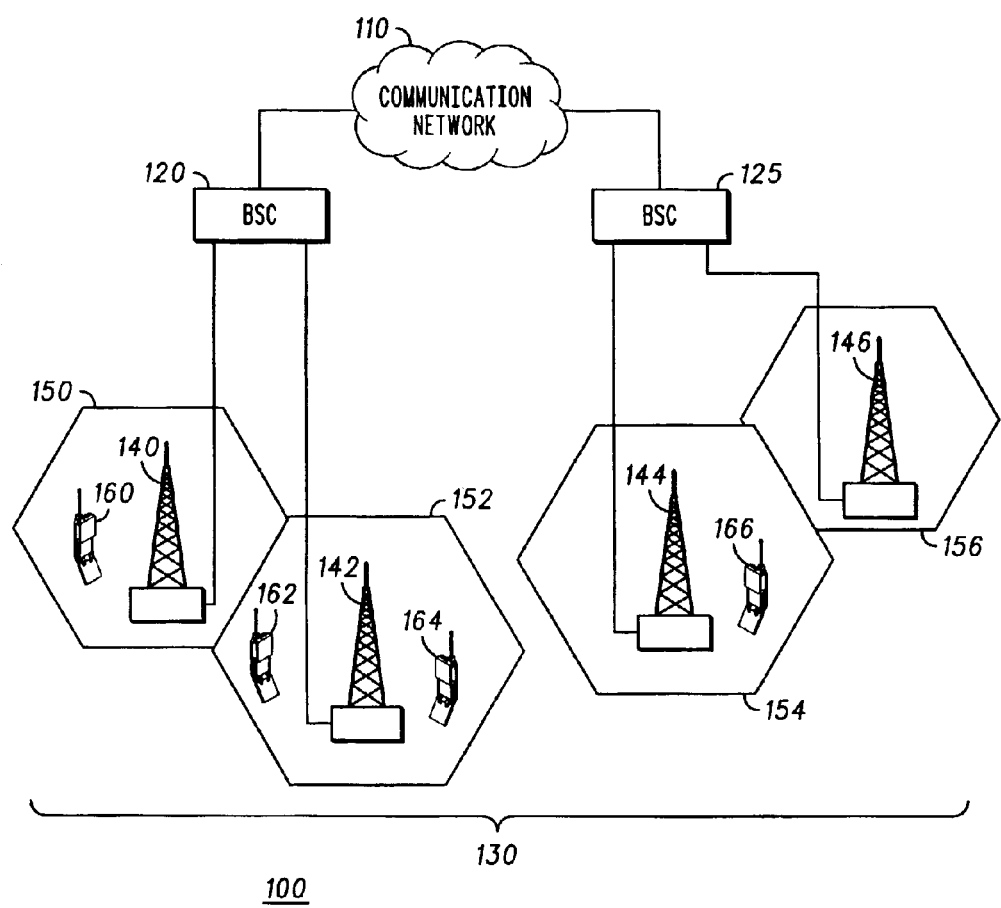
FIGS. 1 and 2 are block diagram representations of a wireless communication system.

A method and a mobile station for controlling bearer assignment are described. In a wireless communication system, a core network is configured to provide communication services to a mobile station. In particular, a first core network such as a packet switched (PS) core network may be configured to provide a first communication service (e.g., a streaming service such as a real-time video), and a second core network such as a circuit switched (CS) core network may be configured to provide a second communication service (e.g., a voice call). While engaging in the first communication service, the mobile station may receive a page request associated with the second communication service. For example, the mobile station may receive a request associated with an incoming voice call during a streaming service (e.g., a real-time video). Because of external (e.g., bandwidth and data rate) and/or internal (e.g., memory) limitations, the mobile station may detect a resource conflict between the first and second communication services. Upon detecting a resource conflict, the mobile station may determine a condition of the resource conflict suggesting delay bearer assignment for the second communication service. The bearer assignment may include information associated with, but is not limited to, a traffic channel for providing the second communication service to the mobile station. The mobile station may delay, accept, or reject the bearer assignment for the second communication service. In the case of delayed bearer assignment, the second core network may postpone assigning the mobile station with a traffic channel for the incoming voice call until the mobile station and/or the user resolve the resource conflict after the incoming voice call is presented to the user.

The user may reject the incoming voice call. Then, the mobile station may notify the second core network that the user is busy so that the incoming voice call may be transferred to a voice messaging service for the caller to leave a voice message. Otherwise, the mobile station may re-allocate resources to accept the incoming voice call. As a result, the mobile station may transmit a request for bearer assignment to the second core network to establish the incoming voice call via a traffic channel.

A communication system in accordance with the present disclosure is described in terms of several preferred embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular system, the IS-95 Code Division Multiple Access (CDMA) digital cellular system, the CDMA 2000 system, the Wideband CDMA (W-CDMA) system, the Personal Communications System (PCS), the Third Generation (3G) system, the Universal Mobile Telecommunications System (UMTS) and variations and evolutions of these protocols. A wireless communication system is a complex network of systems and elements. Typical systems and elements include (1) a radio link to mobile stations (e.g., a cellular telephone or a subscriber equipment used to access the wireless communication system), which is usually provided by at least one and typically several base stations, (2) communication links between the base stations, (3) a controller, typically one or more base station controllers or centralized base station controllers (BSC/CBSC), to control communication between and to manage the operation and interaction of the base stations, (4) a switching system, typically including a mobile switching center (MSC), to perform call processing within the system, and (5) a link to the land line, i.e., the public switch telephone network (PSTN) or the integrated services digital network (ISDN).

A base station subsystem (BSS) or a radio access network (RAN), which typically includes one or more base station controllers and a plurality of base stations, provides all of the radio-related functions. The base station controller provides all the control functions and physical links between the switching system and the base stations. The base station controller is also a high-capacity switch that provides functions such as handover, cell configuration, and control of radio frequency (RF) power levels in the base stations.

The base station handles the radio interface to the mobile station. The base station includes the radio equipment (transceivers, antennas, amplifiers, etc.) needed to service each communication cell in the system. A group of base stations is controlled by a base station controller. Thus, the base station controller operates in conjunction with the base station as part of the base station subsystem to provide the mobile station with real-time voice, data, and multimedia services (e.g., a call).

Referring to FIG. 1, a wireless communication system 100 includes a communication network 110, and a plurality of base station controllers (BSC), generally shown as 120 and 125, servicing a total service area 130. As is known for such systems, each BSC 120 and 125 has associated therewith a plurality of base stations (BS), generally shown as 140, 142, 144, and 146, servicing communication cells, generally shown as 150, 152, 154, and 156, within the total service area 130. The BSCs 120 and 125, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156, and each of these elements are commercially available from Motorola, Inc. of Schaumburg, Ill.

Figure 2:
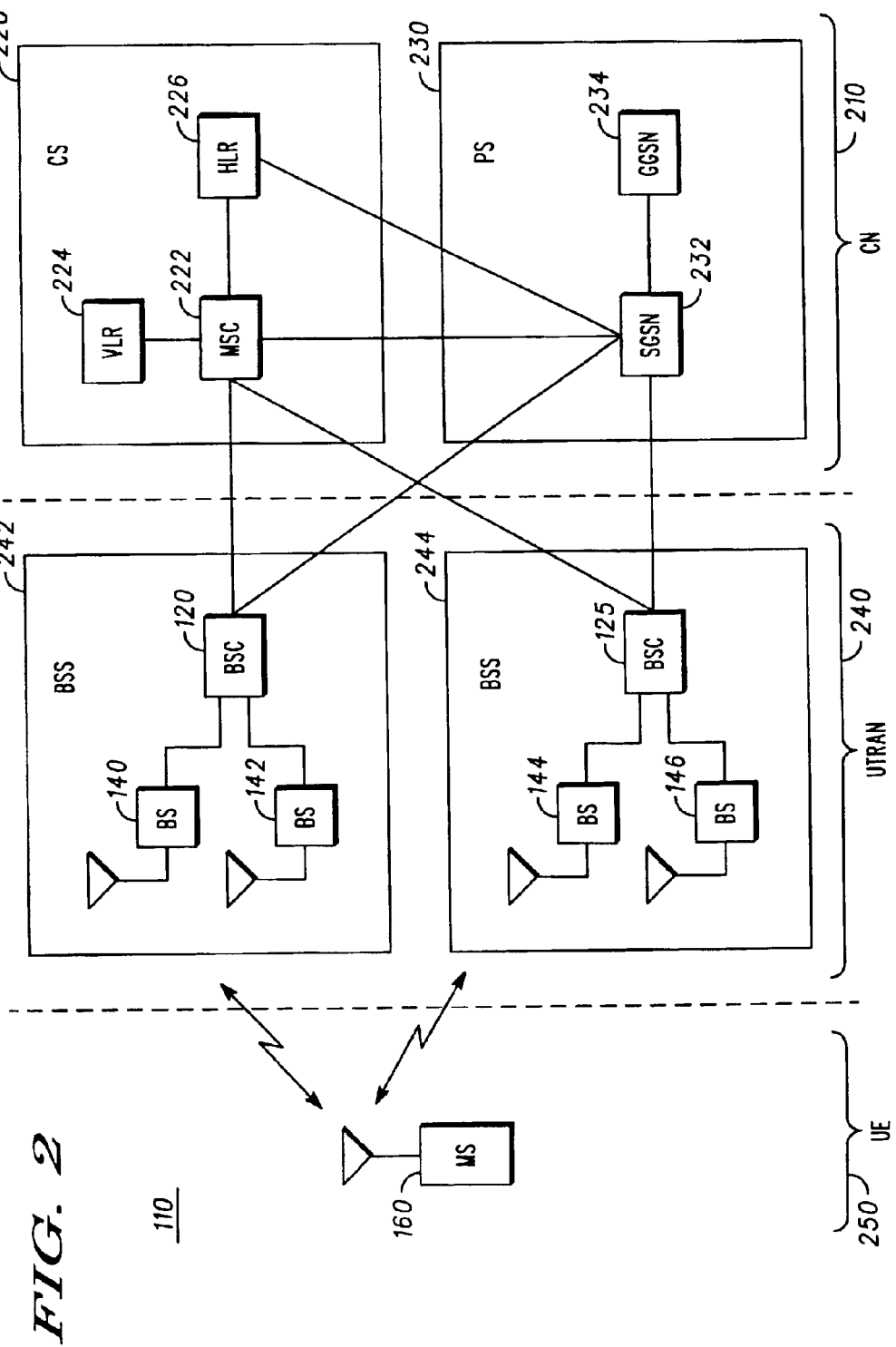

Referring to FIG. 2, the communication network 110 generally includes a core network (CN) 210, which may operate in accordance with, but not limited to, a CDMA based communication protocol (e.g., wide band code division multiple access (W-CDMA) based communication protocol) and a GSM based communication protocol (e.g., a General Packet Radio Service (GPRS) based communication protocol and a UMTS based communication based protocol). In particular, the CN 210 may include, but is not limited to, a circuit-switched (CS) core network 220, and a packet-switched (PS) core network 230. The CS core network 220 generally includes a mobile switching center (MSC) 222, a visitor location register (VLR) 224, and a home location register (HLR) 226. The VLR 224 and the HLR 226 store information associated with subscribers as persons of ordinary skill in the art will readily recognize. Together with the VLR 224 and the HLR 226, the MSC 222 provides call routing and other interface functions between networks. The PS core network 230 generally includes a serving GPRS support node (SGSN) 232 and a gateway GPRS support node (GGSN) 234. In particular, the SGSN 232 may also store information associated with subscribers as persons of ordinary skill in the art will readily recognize. The GGSN 234, which is operatively coupled to the SGSN 232, may serve as an interface between the core network 210 and other external packet data networks (not shown) such as the Internet and corporate intranet.

The core network (CN) 210 is operatively coupled to an UMTS terrestrial radio access network (UTRAN) 240 and a user equipment (UE) 250. The UTRAN 240 includes a base station subsystem (BSS) or a radio access network (RAN) generally shown as 242 and 244. Each of the base station subsystems 242, 244 may include a base station controller (BSC), generally shown as 120 and 125, respectively. As noted above, each BSC 120 and 125 has associated therewith a plurality of base stations (BS), generally shown as 140 and 142, and 144 and 146, respectively.

The user equipment (UE) 250 may be, but is not limited to, a mobile station (one shown as 160). Although the embodiments disclosed herein are particularly well suited for use with a cellular telephone, persons of ordinary skill in the art will readily appreciate that the teachings of this disclosure are in no way limited to such a device. On the contrary, persons of ordinary skill in the art will readily appreciate that the teachings of this disclosure can be employed with other wireless communication devices such as a pager, a personal digital assistant (PDA), and a handheld computer.

Figure 3:
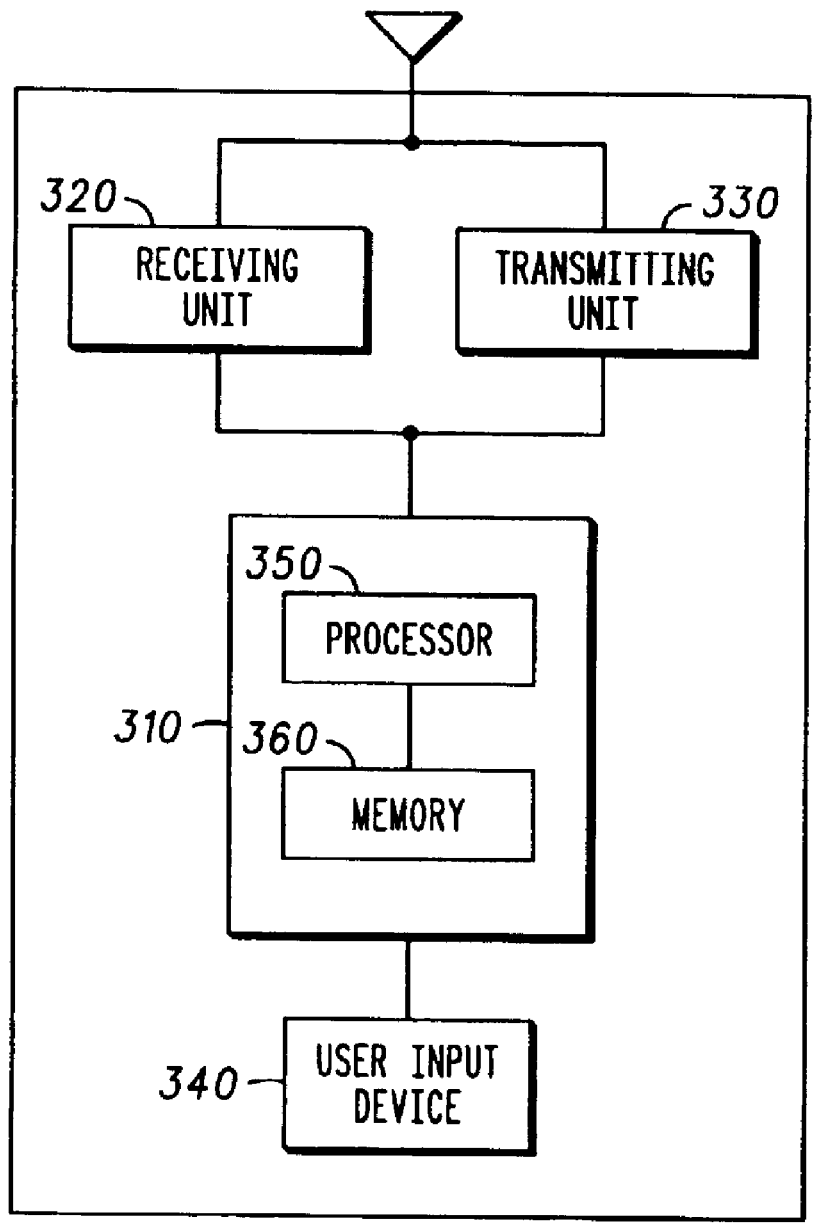
FIG. 3 is a block diagram representation of a mobile station.

Referring to FIG. 3, a mobile station 160 adapted to control bearer assignment is shown. The mobile station 160 generally includes a controller 310, a receiving unit 320, a transmitting unit 330, and a user input device 340. The controller 310 includes a processor 350 and a memory 360. The processor 350 is operatively coupled to the memory 360, which stores a program or a set of operating instructions for the processor 350. The processor 350 executes the program or the set of operating instructions such that the mobile station 160 operates as described herein. The program of the set of operating instructions may be embodied in a computer-readable medium such as, but not limited to, paper, a programmable gate array, an application specific integrated circuit (ASIC), an erasable programmable read only memory (EPROM), a read only memory (ROM), a random access memory (RAM), a magnetic media, and an optical media. The controller 310 is operatively coupled to the receiving unit 320 and the transmitting unit 330. Persons of ordinary skill in the art will readily appreciate that the receiving unit 320 and the transmitting unit 330 may be separate components or integrated into a single component, e.g., a transceiver unit. Further, the controller 310 is operatively coupled to the user input device 340, which may be, but is not limited to, a keyboard, a numeric keypad, an alphanumeric keypad, a touch-sensitive display, and a microphone.

Figure 4:
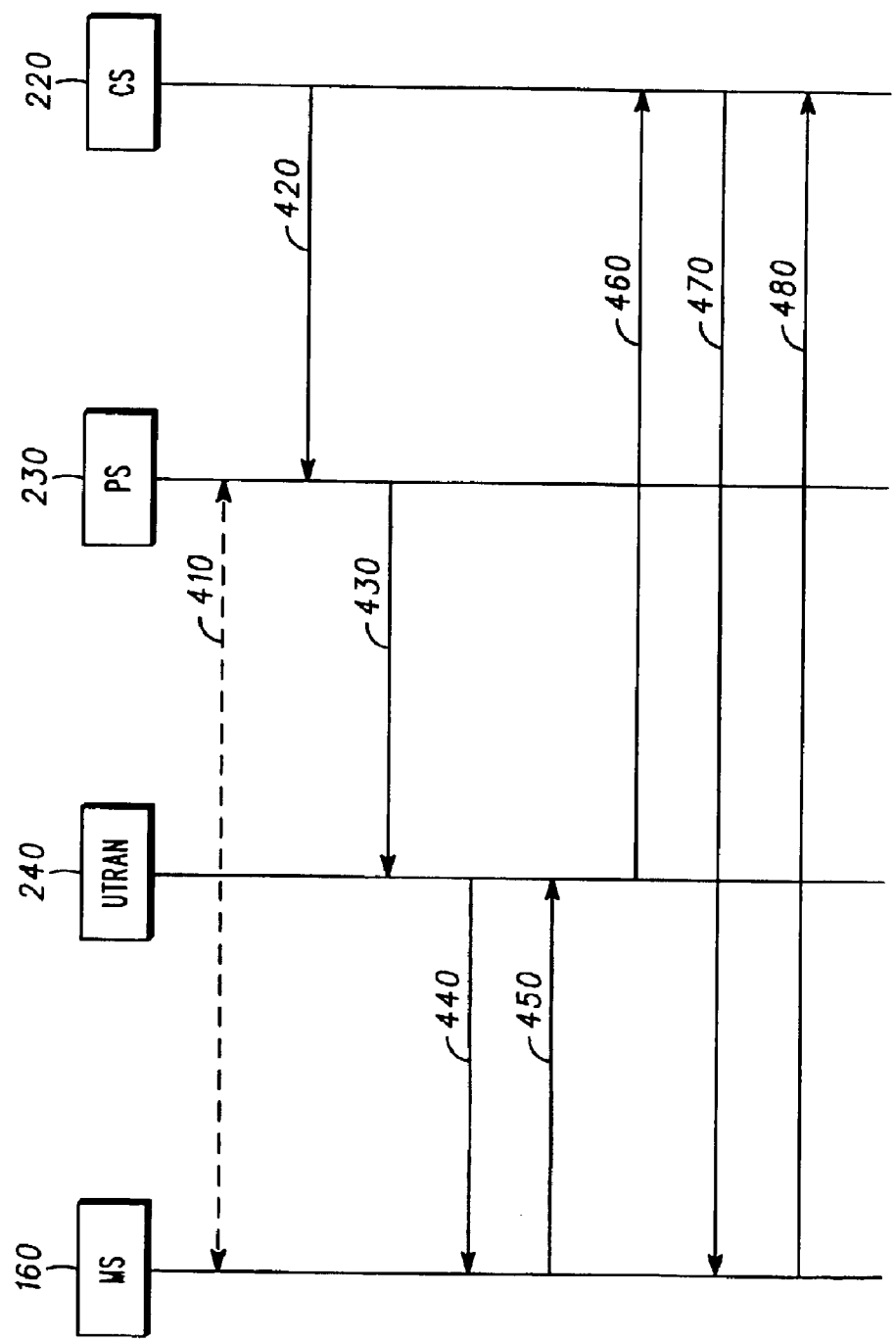
FIG. 4 is a flow diagram representation of a call flow by the mobile station.

Referring to FIG. 4, a basic call flow of the wireless communication system 100 may start with the mobile station 160 engaging in a streaming service 410 via the PS core network 230. For example, the user of the mobile station 160 may be browsing the Internet (i.e., a worldwide system of computer networks). In another example, the user of the mobile station 160 may be either downloading or uploading images and/or files. While the mobile station 160 is engaging in the streaming service 410, the CS core network 220 may attempt to communicate with the mobile station 160. That is, the CS core network 220 may receive an incoming voice call for the mobile station 160. As a result, the SGSN 232 within the PS core network 230 may receive a page 420 from the CS core network 220 requesting for identification (e.g., an international mobile subscriber identity (IMSI)) of the mobile station 160. Accordingly, the UTRAN 240 may receive a page 430 from the PS core network 230 and transmit a paging request 440 to the mobile station 160. That is, the paging request 440 may indicate that a network element (e.g., the CS core network 220) would like to communicate with the mobile station 160. The mobile station 160 may acknowledge the paging request 440 by transmitting a paging response 450 to the UTRAN 240. Upon receiving the paging response 450 from the mobile station 160, the UTRAN 240 may use the radio access network application part (RANAP) 460 to relay the paging response 450 to the CS core network 220 (i.e., the MSC 222 and/or the VLR 224). The mobile station 160 may receive call setup information 470 from the CS core network 220. The call setup information may include information associated with, but is not limited to, type and class of the bearer service (i.e., the communication service from the CS core network 220). Persons of ordinary skill in the art will readily appreciate that some communication services may have priority over other communication services based on type and class.

Because of external and/or internal resource limitations, the mobile station 160 may transmit a request 480 associated with a bearer assignment for the incoming voice call. For example, the bandwidth and/or memory available to the mobile station 160 may limit the mobile station 160 and prevent the streaming service and the voice call service from being provided concurrently within the mobile station 160. As a result, the mobile station 160 may delay the incoming voice call and transmit a request for holding off on the bearer assignment for the incoming voice call. The bearer assignment may include information associated with, but not limited to, a traffic channel for the incoming voice call. If the mobile station decides not delay the bearer assignment, the mobile station 160 may reject the incoming voice call by transmitting a request for no bearer assignment and continue with the streaming service via the PS core network 230. Here, the incoming voice call may be transferred to a voice messaging service associated with the mobile station 160. Alternatively, the mobile station 160 may accept the incoming voice call and transmit a request for the bearer assignment for the incoming voice call. In which case, the CS core network 220 may transmit information associated with a traffic channel for the incoming voice call, and the mobile station 160 may terminate the streaming service 410 to establish the incoming voice call via the traffic channel.

Figure 5:
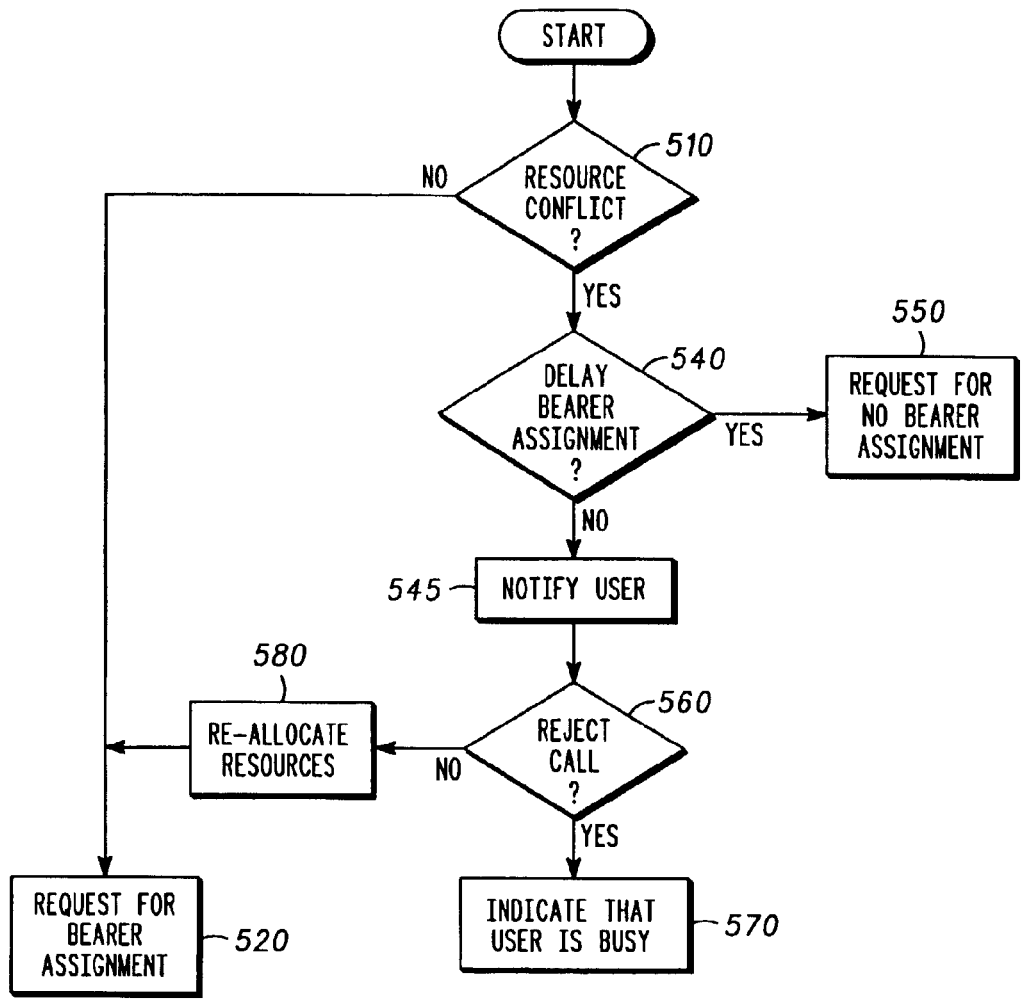
FIG. 5 is a flow diagram illustrating a method for controlling bearer assignment.

One possible implementation of the computer program executed by the mobile station 160 (e.g., via the processor 350) is illustrated in FIG. 5. Persons of ordinary skill in the art will appreciate that the computer program can be implemented in any of many different ways utilizing any of many different programming codes stored on any of many computer-readable mediums such as a volatile or nonvolatile memory or other mass storage device (e.g., a floppy disk, a compact disc (CD), and a digital versatile disc (DVD)). Thus, although a particular order of steps is illustrated in FIG. 5, persons of ordinary skill in the art will appreciate that these steps can be performed in other temporal sequences. Again, the flow chart 500 is merely provided as an example of one way to program the mobile station 160 to control bearer assignment. The flow chart 500 begins at step 510, wherein the mobile station 160 may determine whether a resource conflict within the mobile station 160 exist. If there is no resource conflict, the mobile station 160 may proceed directly to step 520 to transmit a request associated with a bearer assignment for a communication service. That is, the mobile station 160 may receive information associated with a traffic channel so that the mobile station 160 may provide the communication service to a user. Otherwise, the mobile station 160 at step 540 may determine to delay the bearer assignment, and then transmit a request for no bearer assignment at step 550. For example, the mobile station 160 may determine a condition of the resource conflict suggesting to the delay the bearer assignment based on, but not limited to, a type of resource conflict, an incoming caller identifier, and a user input. In which case, the core network may postpone providing the bearer assignment for the communication service to the mobile station 160. If mobile station 160 determines not to delay the bearer assignment based on the condition of the resource conflict, then the mobile station 160 may notify the user at step 545 and proceed to step 560 to determine whether to reject the communication service. For example, the decision to proceed to step 560 may be based on user input (i.e., user input may be static and collected prior to proceeding to step 560). At step 570, the mobile station 160 may reject the communication service and inform the core network 210 that the user is busy. If the communication service is an incoming voice call, for example, the core network 210 may forward the incoming voice call to a voice mail service. If the communication service is not rejected, then the mobile station 160 may proceed to step 580 to re-allocate resources so that the communication service may be accepted by the mobile station 160. Upon re-allocating resources, the mobile station 160 may proceed to step 520 to transmit a request for the bearer assignment for the communication service as described above. Based on the bearer assignment, the mobile station 160 may engage in the communication service provided by the core network 210.

Although the embodiments disclosed herein are particularly well suited for web browsing service and voice call service, persons of ordinary skill in the art will readily appreciate that the teachings are in no way limited to those communication services. On the contrary, persons of ordinary skill in the art will readily appreciate that the teachings of this disclosure can be employed for other variations of communication services such as, but not limited to, a video conference call service, a multimedia messaging service (MMS), and a wireless application protocol (WAP) service.

Many changes and modifications to the embodiments described herein could be made. The scope of some changes is discussed above. The scope of others will become apparent from the appended claims.

What is claimed is:

1. In a wireless communication system, wherein a core network is configured to provide communication services to a mobile station, a method for controlling a bearer assignment, the method comprising:

detecting a resource conflict associated with a communication service within the mobile station;

determining a condition of the resource conflict suggesting to delay a bearer assignment for the communication service; and transmitting a request associated with the bearer assignment to the core network based on the condition of the resource conflict.

2. The method of claim 1, wherein the step of detecting a resource conflict associated with a communication service within the mobile station comprises detecting a resource conflict associated with one of a streaming service, a web browsing service, a voice call service, a video conference call service, a multimedia messaging service, and a wireless application protocol (WAP) service.

3. The method of claim 1, wherein the step of determining a condition of the resource conflict suggesting to delay a bearer assignment for the communication service comprises determining a condition of the resource conflict suggesting to delay a bearer assignment for the communication service based on one of a type of resource conflict, an incoming caller identifier, and a user input.

4. The method of claim 1, wherein the step of transmitting a request associated with the bearer assignment to the core network based on the condition of the resource conflict comprises transmitting one of a request to delay the bearer assignment, a request to reject the bearer assignment, and a request to accept the bearer assignment.

5. The method of claim 1, wherein the step of transmitting a request associated with the bearer assignment to the core network based on the condition of the resource conflict comprises transmitting a request for a traffic channel associated with a communication service to the core network based on the condition of the resource conflict.

6. The method of claim 1, wherein the step of transmitting a request associated with the bearer assignment to the core network based on the condition of the resource conflict comprises transmitting a request associated with the bearer assignment to one of a circuit switched (CS) core network and a packet switched (PS) core network.

7. The method of claim 1, wherein the communication system is one of a code division multiple access (CDMA) based communication system and a time division multiple access (TDMA) based communication system.

8. In a wireless communication system, wherein a core network provides communication services to a mobile station operable to control bearer assignment, the mobile station comprising:

a memory; and a processor operatively coupled to the memory, the processor being programmed to detect a resource conflict associated with a communication service within the mobile station;

the processor being programmed to determine a condition of the resource conflict suggesting to delay a bearer assignment for the communication service; and the processor being programmed to transmit a request associated with bearer assignment to the core network based on the condition of the resource conflict.

9. The mobile station of claim 8, wherein the resource conflict is a conflict associated with one of a streaming service, a web browsing service, a voice call service, a video conference call service, a multimedia messaging service, and a wireless application protocol (WAP) service.

10. The mobile station of claim 8, wherein the condition of the resource conflict is based on one of a type of resource conflict, an incoming caller identifier, and a user input.

11. The mobile station of claim 8, wherein the request is one of a request to delay the bearer assignment, a request to reject the bearer assignment, and a request to accept the bearer assignment.

12. The mobile station of claim 8, wherein the bearer assignment includes information associated with a traffic channel.

13. The mobile station of claim 8, wherein the core network is one of a circuit-switched (CS) core network and a packet-switched (PS) core network.

14. The mobile station of claim 8 is operable in accordance with one of a code division multiple access (CDMA) based communication protocol and a time division multiple access (TDMA) based communication protocol.

15. The mobile station of claim 8 is one of a cellular telephone, a pager, a personal digital assistant (PDA), and a handheld computer.

16. In a wireless communication system, wherein a core network provides communication services to a mobile station, and wherein a processor operates in accordance with a computer program embodied on a computer-readable medium for controlling bearer assignment, the computer program comprising:

a first routine that directs the processor to detect a resource conflict associated with a communication service within the mobile station;

a second routine that directs the processor to determine a condition of the resource conflict suggesting to delay a bearer assignment for the communication service; and a third routine that directs the processor to transmitting a request associated with the bearer assignment to the core network based on the condition of the resource conflict.

17. The computer program of claim 16, wherein the first routine comprises a routine that directs the processor to detect a resource conflict associated with one of a streaming service, a web browsing service, a voice call service, a video conference call service, a multimedia messaging service, and a wireless application protocol (WAP) service.

18. The computer program of claim 16, wherein the second routine comprises a routine that directs the processor to determine a condition of the resource conflict suggesting to delay a bearer assignment for the communication service based on one of a type of resource conflict, an incoming caller identifier, and a user input.

19. The computer program of claim 16, wherein the third routine comprises a routine that directs the processor to transmit one of a request to delay the bearer assignment, a request to reject the bearer assignment, and a request to accept the bearer assignment.

20. The computer program of claim 16, wherein the third routine comprises a routine that directs the processor to transmit a request for a traffic channel.

21. The computer program of claim 16, wherein the third routine comprises a routine that directs the processor to transmit a request associated with the bearer assignment to one of a circuit switched (CS) core network and a packet switched (PS) core network.

22. The computer program of claim 16 is operable in accordance operable in accordance with one of a code division multiple access (CDMA) based communication protocol and a time division multiple access (TDMA) based communication protocol.

23. The computer program of claim 16, wherein the medium is one of paper, a programmable gate array, application specific integrated circuit, erasable programmable read only memory, read only memory, random access memory, magnetic media, and optical media.

24. In a wireless communication system, wherein a first core network is configured to provide a first communication service and a second core network is configured to provide a second communication service to a mobile station, a method for controlling bearer assignment associated with the mobile station, the method comprising:

provide the first communication service within the mobile station;

receiving a paging request associated with the second communication service;

detecting a resource conflict within the mobile station between the first and second communication services;

determining a condition of the resource conflict suggesting to delay a bearer assignment associated with the second communication service; and communicating with the second core network based on the condition of the resource conflict.

25. The method of claim 24, wherein the step of detecting a resource conflict within the mobile station between the first and second communication services comprises detecting a resource conflict within the mobile station associated with at least one of a streaming service, a web browsing service, a voice call service, a video conference call service, a multimedia messaging service, and a wireless application protocol (WAP) service.

26. The method of claim 24, wherein the step of communicating with the second core network based on the condition of the resource conflict comprises transmitting one of a request to delay the bearer assignment, a request to reject the bearer assignment, and a request to accept the bearer assignment to the second core network.

27. The method of claim 24, wherein the step of communicating with the second core network based on the condition of the resource conflict comprises transmitting a request for a traffic channel for the second communication service.

28. The method of claim 24 is operable in accordance with one of a code division multiple access (CDMA) based communication protocol and a time division multiple access (TDMA) based communication protocol.

* * * * *